(12) United States Patent
Nguyen

(10) Patent No.: US 6,795,886 B1
(45) Date of Patent: Sep. 21, 2004

(54) INTERCONNECT SWITCH METHOD AND APPARATUS

(75) Inventor: Chinh K. Nguyen, San Diego, CA (US)

(73) Assignee: NCR Corporation, Dayton, OH (US)

( * ) Notice: Subject to any disclaimer, the term of this patent is extended or adjusted under 35 U.S.C. 154(b) by 376 days.

(21) Appl. No.: 09/746,915

(22) Filed: Dec. 22, 2000

(51) Int. Cl.[7] .............................................. G06F 13/00
(52) U.S. Cl. ........................ 710/310; 710/316; 370/412
(58) Field of Search ........................ 710/22, 310, 316; 709/250; 711/216; 370/390, 392, 401, 427, 474, 471, 412–418, 398

(56) References Cited

U.S. PATENT DOCUMENTS

| | | | | |
|---|---|---|---|---|
| 4,486,877 A | * | 12/1984 | Turner | 370/249 |
| 5,193,149 A | * | 3/1993 | Awiszio et al. | 709/250 |
| 5,923,654 A | * | 7/1999 | Schnell | 370/390 |
| 6,009,508 A | * | 12/1999 | May et al. | 712/41 |
| 6,128,728 A | * | 10/2000 | Dowling | 712/228 |
| 6,134,246 A | * | 10/2000 | Cai et al. | 370/474 |
| 6,134,607 A | * | 10/2000 | Frink | 710/22 |
| 6,233,389 B1 | * | 5/2001 | Barton et al. | 386/46 |

* cited by examiner

Primary Examiner—Xuan Thai
(74) Attorney, Agent, or Firm—Trop, Pruner & Hu, P.C.; John D. Cowart

(57) ABSTRACT

An interconnect switch is used to couple input ports and output ports. The interconnect switch includes a central buffer having a number of storage entries to store data units from input ports. When an output port is available, data unit(s) are transferred from the central buffer to an output port. A main pointer queue contains addresses that point to storage entries in the central buffer.

25 Claims, 8 Drawing Sheets

EMPTY QUEUE

GROWING QUEUE

FULL QUEUE

INTERCONNECT SWITCH METHOD AND APPARATUS

TECHNICAL FIELD

The invention relates to interconnect switches for use in devices and systems.

BACKGROUND

A multiprocessor system typically includes a plurality of processors. In some multiprocessor systems, a distributed storage or memory system having plural storage or memory modules is employed. The plural processors are capable of executing in parallel, and thus are able to read and write to the memory modules concurrently. As a result, multiple data streams often have to be communicated between the processor nodes, processors and the memory modules, and the processor nodes and distributed storage at the same time.

To improve concurrency, an interconnect switch is employed to interconnect the processor nodes, the processors and the memory modules, and the processor nodes and storage. The interconnect switch has a number of input ports (that usually correspond to the number of processors) and a number of output ports (that usually correspond to the number of memory modules). Typically, the interconnect switch is a crossbar-switching network that couples the input ports to the output ports. The interconnect switch can be implemented in an integrated circuit device such as an application specific integrated circuit (ASIC) device.

In a typical interconnect switch, a first-in-first-out (FIFO) queue is associated with each of the input ports. One of the issues involved in many interconnect switches is blocking of data. When data at the front of an input FIFO queue cannot be forwarded because of contention with another input FIFO queue for the same output port, trailing units of data are blocked from being forwarded to another output port that is available. As a result, a delay is experienced in the communication of data through the interconnect switch. In many high-speed systems, such delays may cause degradation of overall system performance.

SUMMARY

In general, a device comprises a plurality of input ports, a plurality of output ports, and an interconnect switch between the input and output ports. The interconnect switch comprises a buffer in a circular queue containing at least one pointer to indicate an available one of plural storage locations in the buffer.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
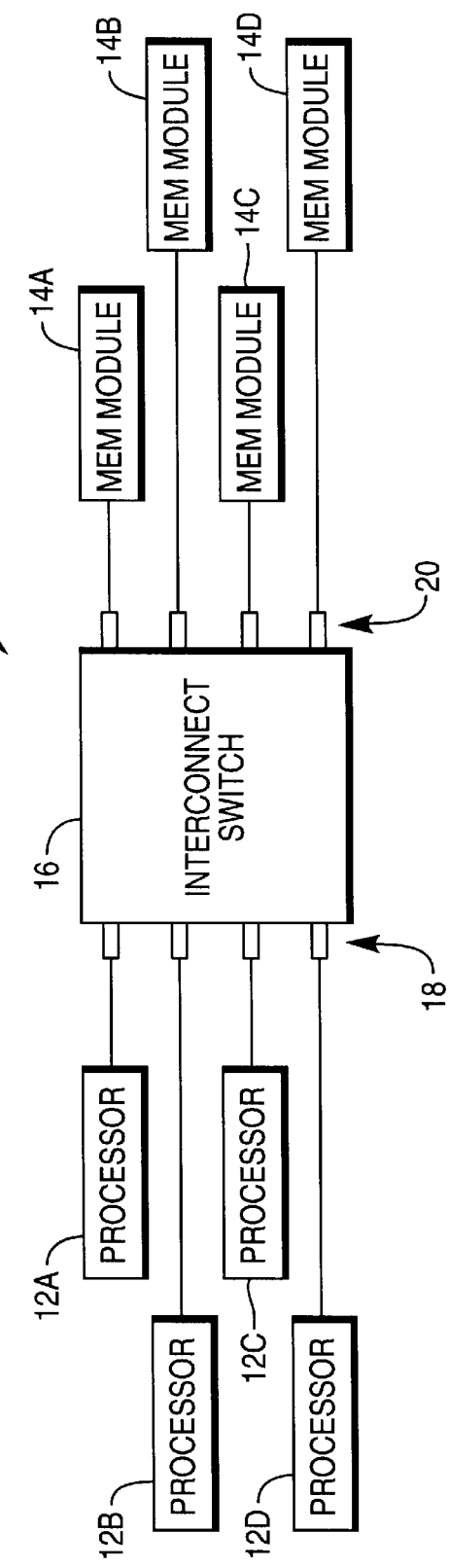
FIG. 1 is a block diagram of an example embodiment of a node having components that are coupled by an interconnect switch.

FIG. 1 illustrates an example node or system 10 that includes a number of components that are coupled by an interconnect switch 16. In the example of FIG. 1, the components that are coupled to the interconnect switch 16 include plural processors 12A–12D connected to a first set of ports 18 ("input ports") of the interconnect switch 16, and memory modules 14A–14D connected to a second set of ports 20 ("output ports"). Data streams that occur as a result of processor execution (e.g., reads and writes of the memory modules 14A–14D) are routed through the interconnect switch 16. In another embodiment, the interconnect switch 16 can be used to interconnect processors with processors or to interconnect processor nodes with storage.

In accordance with some embodiments of the invention, the interconnect switch 16 enhances throughput through the interconnect switch 16 by employing a central buffer storage and queuing mechanism. Generally, the interconnect switch includes a central buffer that holds data units transferred from the input ports until respective output ports become available. A queuing mechanism allocates entries in the central buffer on an as-needed basis. Once a data unit from a central buffer entry is transmitted to an output port, the entry is indicated as being available for use again to store a data unit for another transfer operation. Indicators in the form of pointers are provided in the queuing mechanism to indicate which entries in the central buffer are available—as a consequence, compute- and time-intensive comparison operations need not be made to find available central buffer entries.

Another benefit of the central buffer and queuing mechanism is that head-of-the-line blocking at the input side is reduced, since data can be quickly moved from an input port to the central buffer. A further benefit is that allocation of resources in the interconnect switch is made flexible, with the allocation performed "on demand." The on-demand allocation is possible by use of the central buffer and a circular queue containing pointers to storage locations in the central buffer. Thus, available resources that are not being used by inactive ports can be used for active ports, which increases utilization of interconnect switch resources and thus the efficiency and speed of the interconnect switch.

Further, by using the central buffer, the interconnect switch can handle packets that vary in size. Also, an efficient mechanism is provided to support multicasting of packets, which involves one input port transmitting packets to more than one output port. Also, "wormhole routing" can also be performed using some embodiments of the interconnect switch 16. Wormhole routing involves sending data as soon as the data is received, as compared to the "store and forward" technique.

Figure 2:
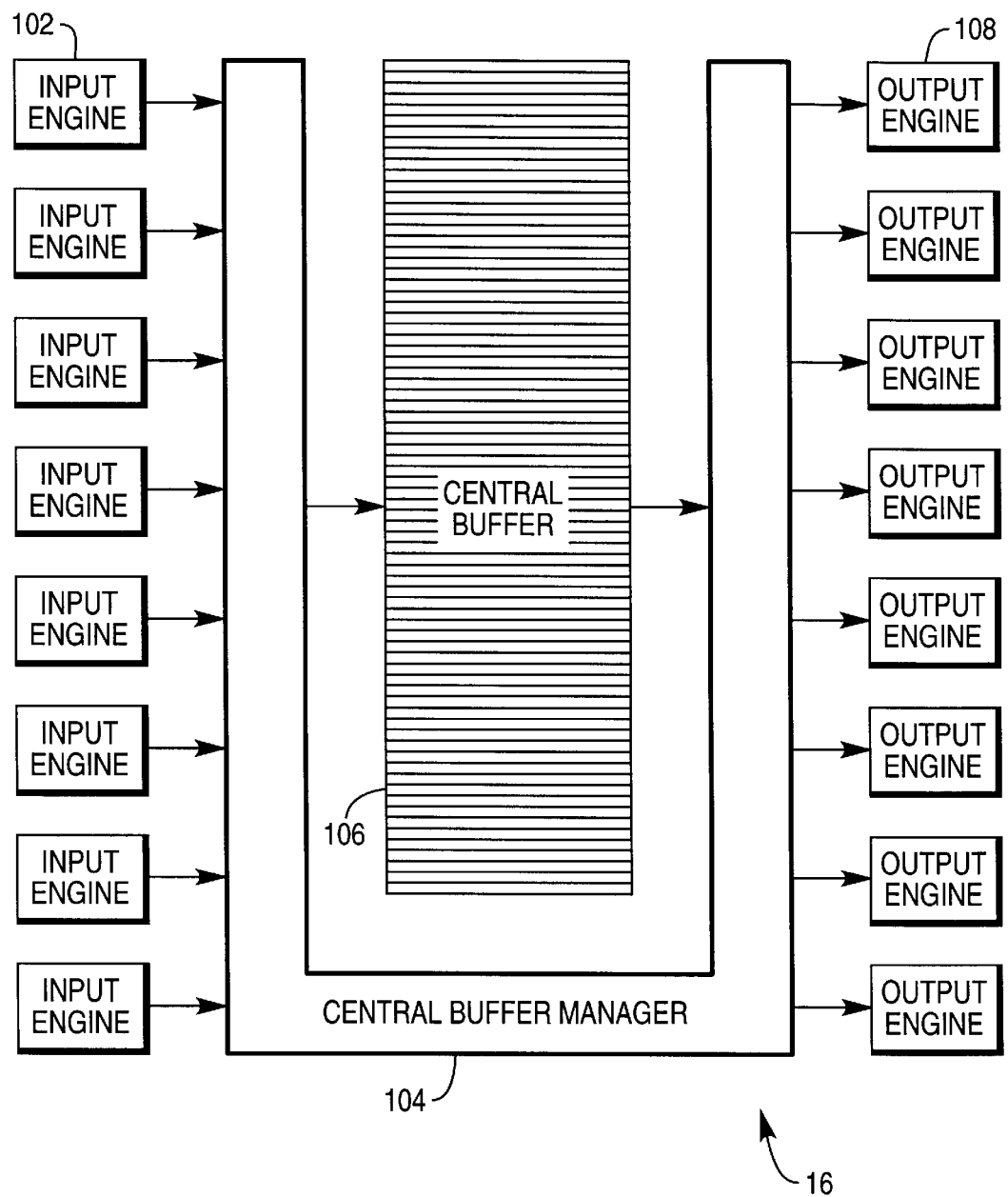
FIG. 2 illustrates components of the interconnect switch of FIG. 1, which contains a plurality of input engines corresponding to input ports, a plurality of output engines corresponding to output ports, a central buffer, and a central buffer manager, in accordance with an embodiment.

FIG. 2 illustrates the general architecture of the interconnect switch 16. The interconnect switch 16 includes a plurality of input engines 102 that correspond to the input ports 18 and a plurality of output engines 108 that correspond to the output ports 20. A central buffer 106 has a number of entries that are used to store data units, referred to as "flits" (flow control digits). A flit is routed from one input engine 102 to a destination output engine 108. A flit can also be multicast from the input engine 102 to plural destination output engines 108. If a destination output engine 108 is available, then flit(s) from the input engine 102 can bypass the central buffer 106 for routing to the destination output engine 108. However, if the output engine 108 is unavailable (e.g., the output engine is busy receiving data of another input engine 102), then the flit(s) are stored into the central buffer 106 until the destination output engine 108 is ready to receive data. Storage of data from the input engine 102 into the central buffer 106 is managed by the central buffer manager 104.

Figure 3:
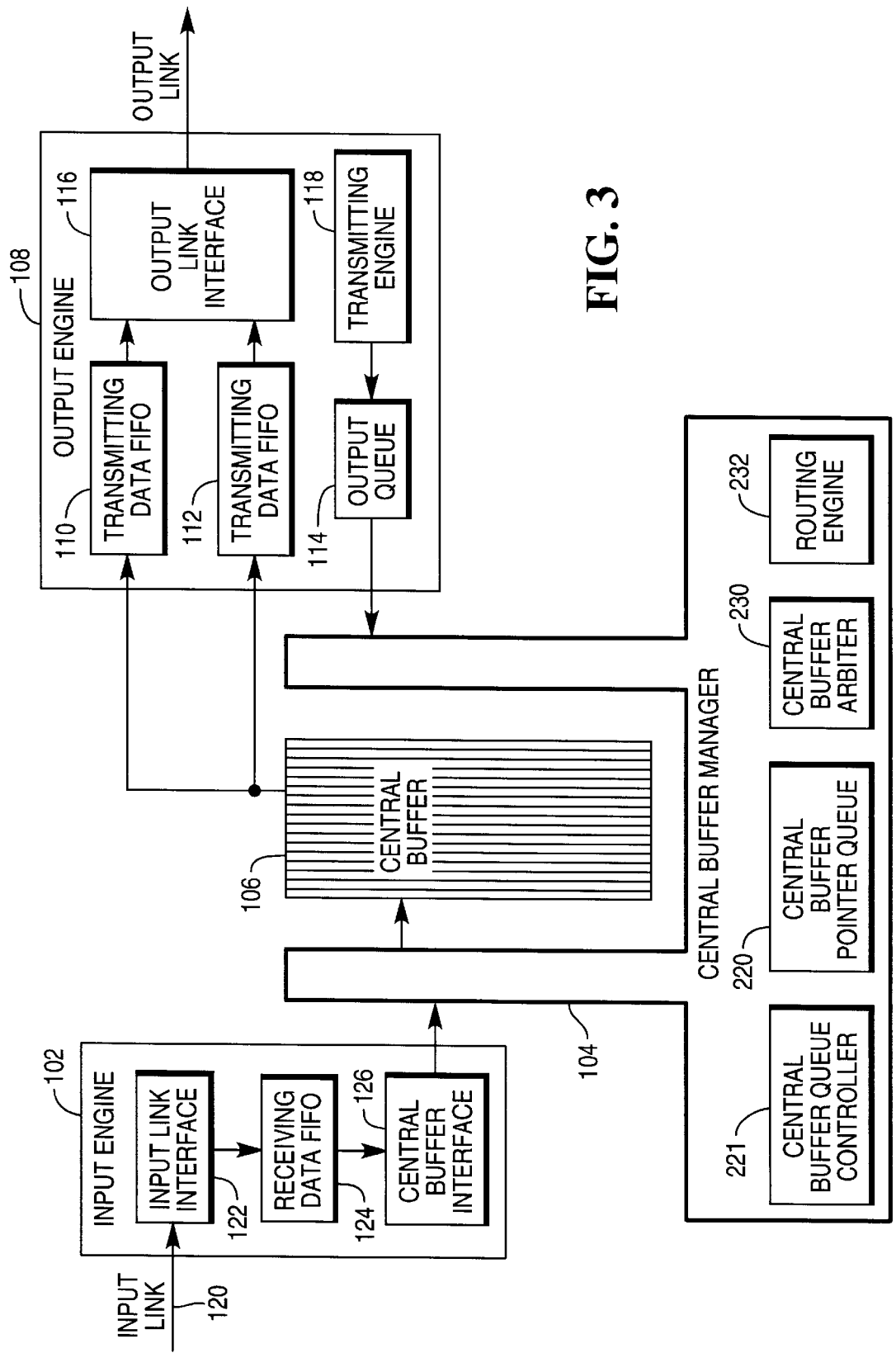
FIG. 3 is a block diagram of components of the input engine, output engine, and central buffer manager of FIG. 2.

As shown in FIG. 3, components of the input engine 102, the output engine 108, and the central buffer manager 104 are shown. Data is carried over an input link 120 from an input port 18 to the input engine 102, which includes an input link interface 122. The input link interface 122 manages the input physical layer protocol, which includes clock synchronization or re-synchronization. Additionally, the input link interface 122 manages link-level protocol messaging such as flow control signaling to the source node (e.g., sending acknowledgment signaling or credit available back to the source node). In the example of FIG. 1, the source node is a processor 12. The input link interface 122 also decodes the encoded incoming data into packet format.

The input engine 102 further includes an input first-in-first-out (FIFO) storage 124 that accumulates incoming data packets from the input link interface 122 to be forwarded to the central buffer 106 or to an output engine 108. A central buffer interface 126 is coupled to the input FIFO storage 124. The central buffer interface 126 checks for packet errors, segments the packets into flits, and requests the central buffer manager 104 to write flits into the central buffer 106. The input engine 102 does not necessarily have to have an entire packet before portions of the packet can be forwarded to the central buffer 106. As long as the packet header has been decoded and there is enough data for a flit, the flit is ready to be sent to the central buffer 106.

The central buffer manager 104 includes a central buffer pointer queue 220, a central buffer arbiter 230, and a routing engine 232. The central buffer pointer queue 220 is a circular queue (described further below) that includes addresses (referred to as "flit pointers") pointing to storage entries in the central buffer 106. In one embodiment, the number of entries in the central buffer pointer queue 220 is equal to the number of storage entries in the central buffer 106. The central buffer pointer queue 220 can be implemented with random access memory, such as a static random access memory (SRAM) or a dynamic random access memory (DRAM). Alternatively, the central buffer pointer queue 220 can be implemented with other types of storage devices. The circular behavior of the central buffer pointer queue 220 is provided by a central buffer pointer queue controller 221, which generates addresses pointing to locations of the central buffer pointer queue 220 that are incremented as flit pointers in the central buffer pointer queue are being used. The addresses pointing to locations of the central buffer pointer queue are wrapped to respective initial values (e.g., zero) when they cross the last location of the central buffer pointer queue 220.

The central buffer arbiter 230 arbitrates among input engines and output engines for access to the central buffer 106. The input engine 102, as the consumer of the central buffer 106, requests the central buffer arbiter 230 for a flit pointer that points to a storage entry of the central buffer 106 into which a packet flit can be written. The output engine 108, as the recycler of the central buffer 106, returns a flit pointer to the central buffer pointer queue 220 after completing loading the flit data into the output FIFO.

In response to receiving a flit from the central buffer arbiter 230, the routing engine 232 determines a routing path and moves the first flit pointer (of the central buffer pointer queue 220) of the packet into an output pointer queue 114 of the target output engine 108. The output pointer queue 114 of each output engine 108 stores flit pointers to packet flits in the central buffer 106 that are to be transmitted by that output engine 108.

The interconnect switch 16 is also capable of performing multicasting of a packet from one input engine 102 to plural output engines 108. According to one embodiment, for a multicast packet, only one designated output port of the interconnect switch 16 is used for receiving the flit pointer. The routing engine 232 can select which one of the output engines 108 is to receive the multicast packet. The designated output engine 108 can then perform data replication to all other output engines 108 involved in the multicast.

In the illustrated embodiment, each output engine 108 includes a first output FIFO storage 110 and a second output FIFO storage 112. Packet flits that are to be transmitted are loaded into the FIFO storage 110 or 112, either from the central buffer 106 or directly from an input engine 102. Flits are accumulated in the output FIFO storage 110 or 112 until a packet is formed. The two transmitting data FIFO storage devices 110 and 112 are intended to function as a single FIFO queue. An output link interface 116 (in conjunction with a transmit engine 118) alternately selects the two FIFO storage devices 110 and 112 to transmit data. In another embodiment, instead of multiple FIFO storage devices, a single output FIFO storage is used.

One reason for using plural output FIFO storage devices is to support multicast. As a multicast flit arrives at the transmit engine 118 of the master output engine 108, there is an empty output FIFO storage in each output engine to store the data to be multicast. Without the second FIFO storage, the logic in the transmit engine 118 may have to wait until the output FIFO storage is empty before multicast data can be stored.

In addition, the output link interface 116 manages the output link layer protocol, including clock synchronization. The output link interface 116 also retrieves a packet from the output FIFO storage 110 or 112, encodes the data according to the link protocol, and transmits the packet.

In multicast operations, the transmit engine 118 of one of plural destination output engines 108 is selected as the "master" transmit engine, which is responsible for receiving multicast data and for distributing the data to the other output engines 108.

The output engine 108 also includes an output pointer queue 114, which is a circular queue similar to the central buffer pointer queue 220 in the central buffer manager 104. The output pointer queue 114 stores flit pointers that point to storage entries in the central buffer 106 that contain flits to be transmitted by the output engine 108. Based on a flit pointer retrieved from the output pointer queue 114, the transmit engine 118 accesses the corresponding location in the central buffer 106 to retrieve a flit for loading into output FIFO storage 110 or 112 and returns the flit pointer to the central buffer queue.

Figure 4:
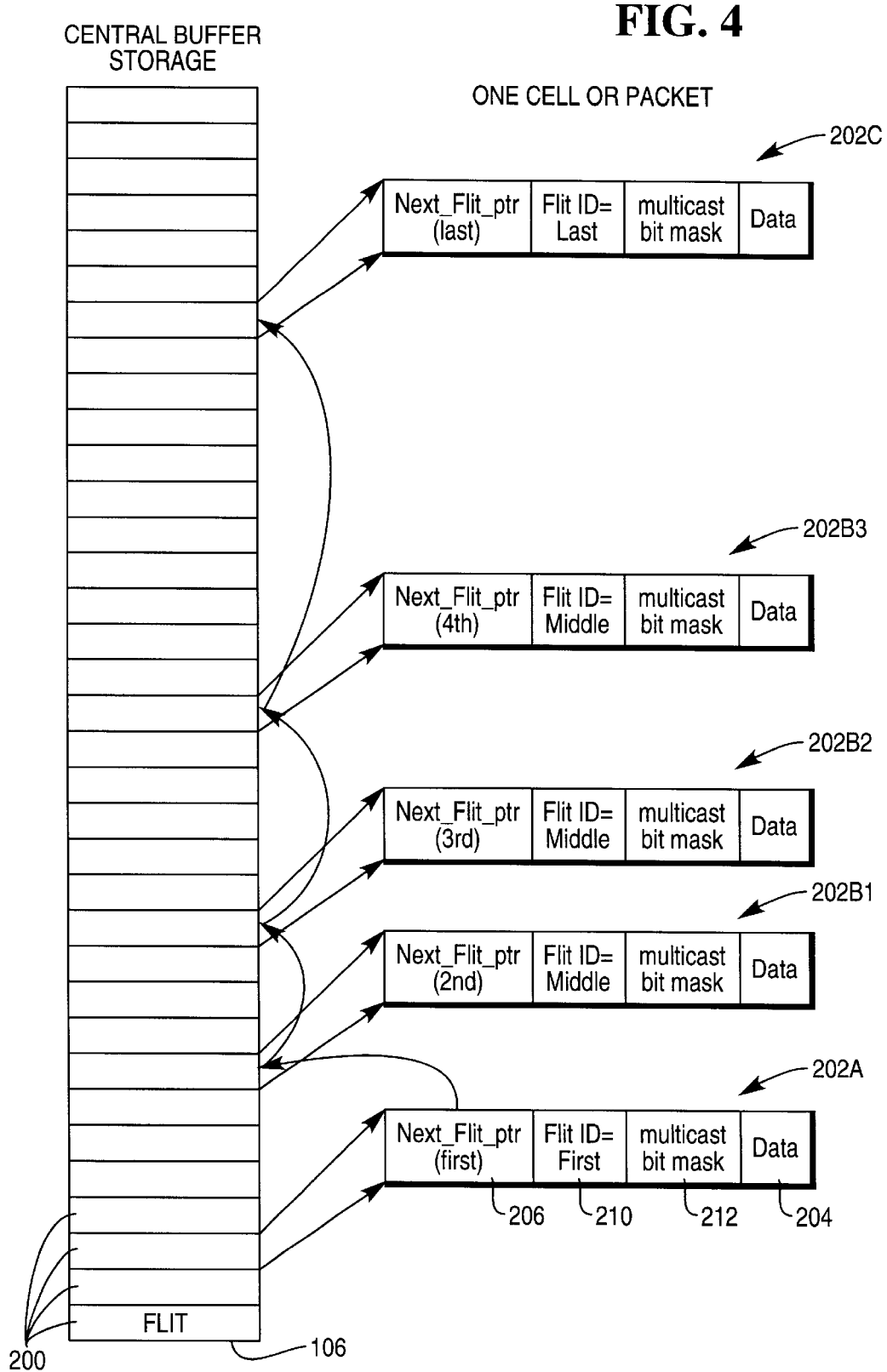
FIG. 4 illustrates contents of a "flit" that is stored in each entry of the central buffer.

As shown in FIG. 4, the central buffer 106 includes multiple storage locations or entries 200, with each entry capable of storing a flit 202. A packet or cell contains one or more flits. In the example of FIG. 4, the illustrated packet or cell contains five flits 202A, 202B1, 202B2, 202B3, and 202C. As shown, the flits of one packet can be stored in non-sequential order within the central buffer 106. Each flit 202 contains a data portion that contains the data to be communicated; and a next flit pointer 206, Next_Flit_Ptr, which points to the location of the next flit in the packet. As shown in FIG. 4, the flit 202A is the first flit of the packet, while the flit 202C is the last flit of the packet. By using the Next_Flit_Ptr pointer 206, multiple flits can be linked together to form a packet. In addition, use of the Next_Flit_Ptr pointer 206 provides for a linked list structure that allows a packet to be variable in size. Thus, if a packet contains a greater or smaller number of flits, the number of entries 200 in the central buffer 106 are allocated accordingly.

Each flit 202 also includes a flit identifier (flit ID) 210, which identifies the position of the flit in a packet (e.g., first, middle, or last). Thus, the flit ID can indicate if a flit is the first flit of the packet, the last flit of the packet, or an intermediate flit between the first and last flits. In the example of FIG. 4, the flit 202A is the first flit, the flits 202B1, 202B2, 202B3 are the middle flits, and the flit 202C is the last flit of the packet. Each flit also includes a multicast bit mask 212 having plural bits, with each bit corresponding to an output port. If a bit in the multicast bit mask 212 is set to an active state, then the corresponding output port is selected for receiving data. To perform a multicast transmission, plural bits in the multicast bit mask 212 are set to the active state. If a unicast is performed instead, then only one of the bits of the multicast bit mask 212 is set active.

Figure 5:
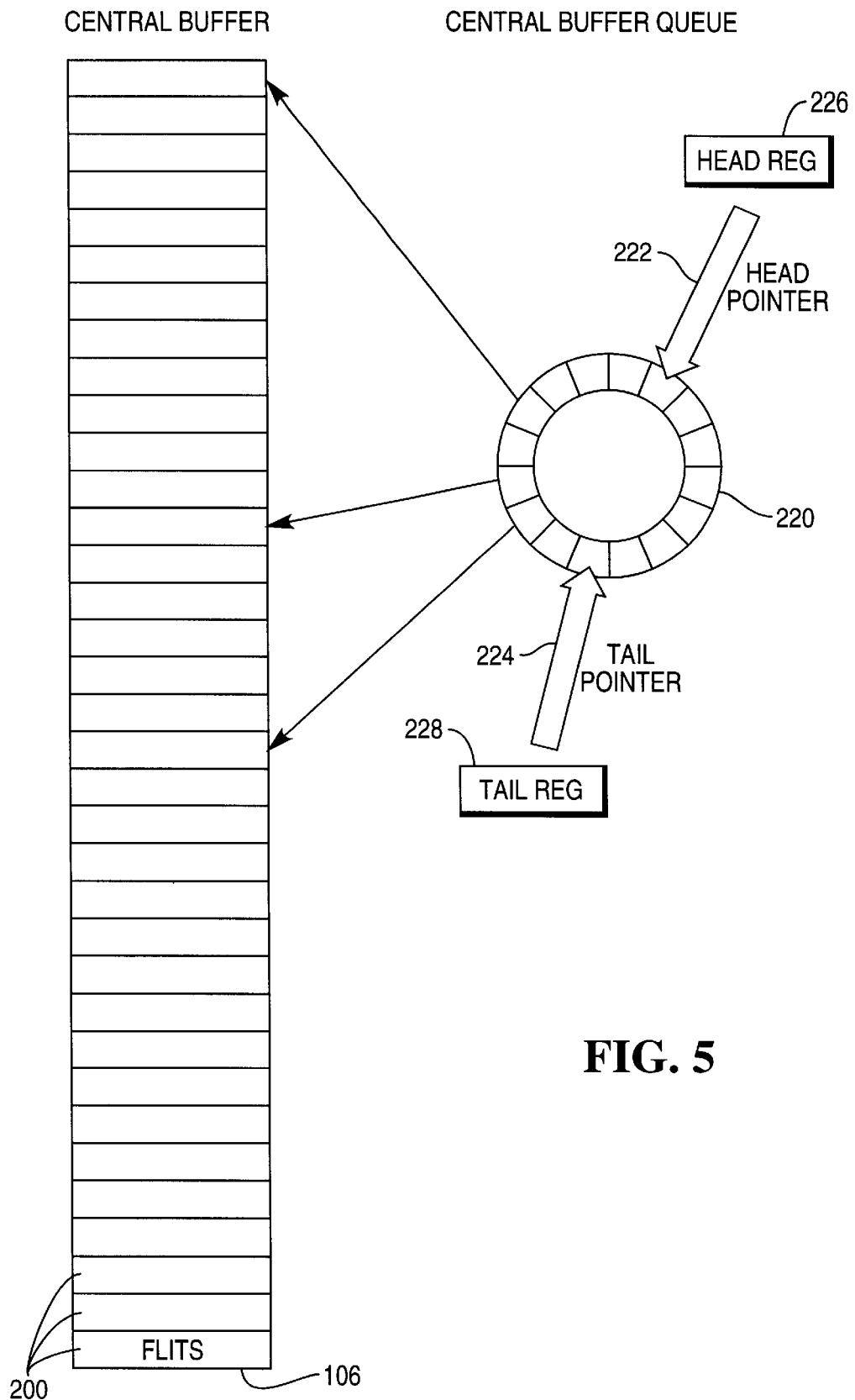
FIG. 5 illustrates a central buffer pointer queue containing pointers to the central buffer in the interconnect switch of FIG. 1.

As shown in FIG. 5, the central buffer pointer queue 220, which in some embodiments is a circular queue, contains flit pointers to entries 200 of the central buffer 106. The central buffer pointer queue 220 is also associated with a head pointer 222 and a tail pointer 224. The head and tail pointers 222 and 224 are stored in respective head and tail pointer registers 226 and 228, which are part of the central buffer queue controller 221 (FIG. 3).

Figure 6A:
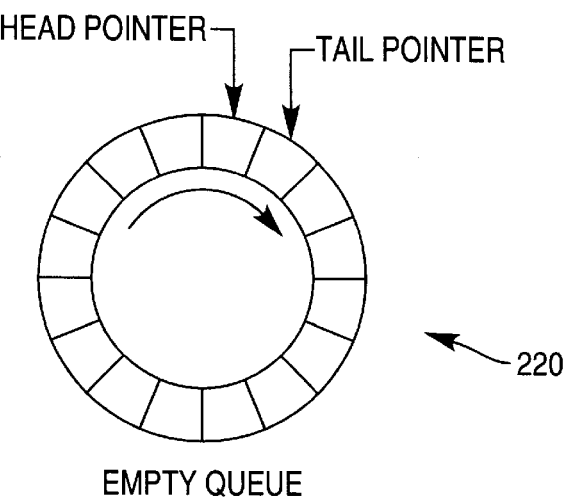
FIGS. 6A–6C illustrate different states of the central buffer pointer queue of FIG. 5.
Figure 6B:
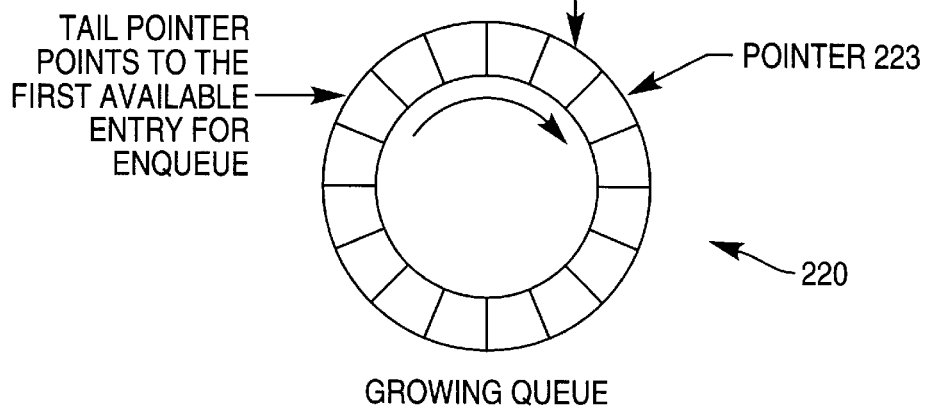
Figure 6C:
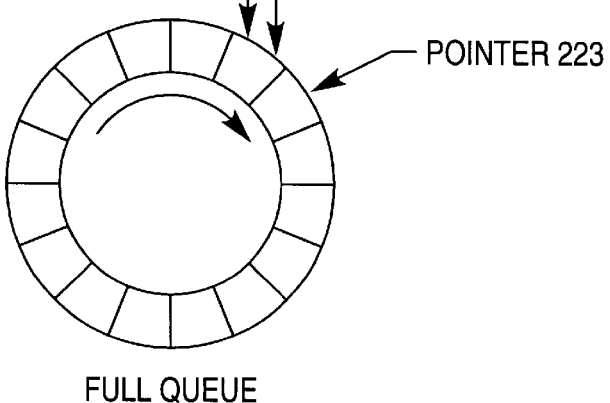

As shown in FIGS. 6A–6C, the central buffer pointer queue has three possible states. In FIG. 6A, the head pointer 222 is one position behind the tail pointer 224 to indicate that the central buffer pointer queue 220 is empty. However, in FIG. 6C, when both the head and tail pointers are pointing to the same location of the central buffer pointer queue 220, the queue 220 is considered to be full. An intermediate state of the central buffer pointer queue 220 is illustrated in FIG. 6B, where the head and tail pointers are apart to indicate that the pointer queue 220 is being processed. The first position after the position pointed to by the head pointer 222 is the first valid entry of the central buffer pointer queue 220. This position is pointed to by a pointer 223 that is equal to the head pointer 222 plus the value one. The valid entry contains a flit pointer to an available storage entry in the central buffer. Thus, generally, the head pointer 222 indicates an available location in the central buffer 106.

As shown in FIG. 6B, the entries of the central buffer pointer queue 220 between (in the clockwise direction) the tail pointer 224 and the head pointer 222 (including the entry pointed to by the tail pointer) contains invalid or blank entries. An invalid or blank entry of the central buffer pointer queue 220 does not contain a valid flit pointer.

The central buffer pointer queue 220 is initialized to the full queue state by setting both the head and tail pointers to the same value, such as a zero value or some other predetermined value. After reset, all flit pointers in the central buffer pointer queue 220 are available to all input ports. At reset, the entries of the central buffer pointer queue 220 store sequential flit pointers that point to a sequential order of entries in the central buffer 106. However, once operation begins, and the flit pointers are moved between the central buffer pointer queue 220 and the output pointer queues 114, the order of the flit pointers in the central buffer pointer queue 220 may become non-sequential.

Figure 7:
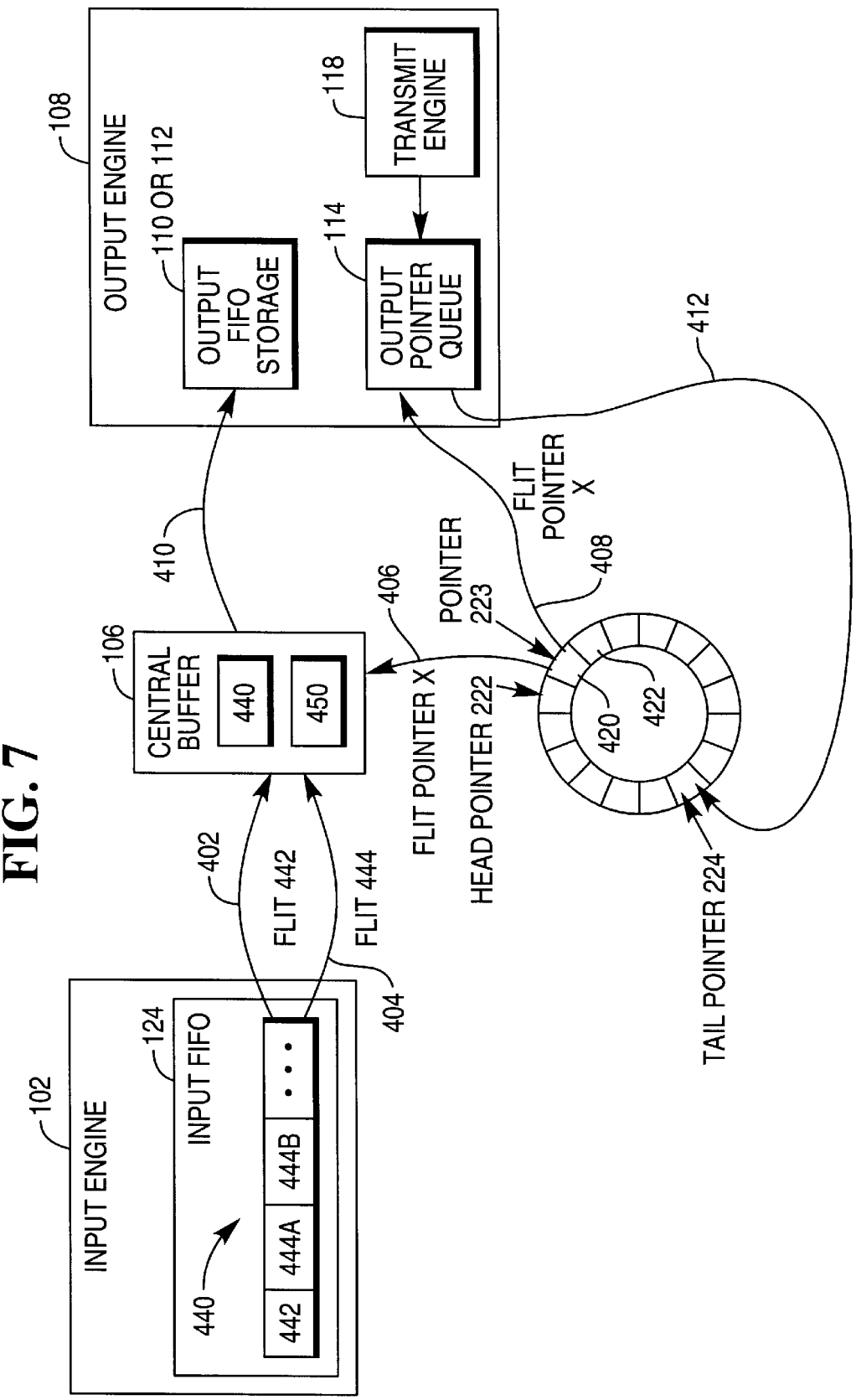
FIG. 7 illustrates an example operation of the interconnect switch of FIG. 1.

An example operation of the interconnect switch 16 is illustrated in FIG. 7. The input engine 102 stores a packet 440 in its input FIFO storage 124. The packet 440 is divided into plural flits, with flit 442 being the first flit of the packet 440 and flits 444A, 444B, and so forth being the remaining flits. The input-engine 102 writes (at 402) the first packet flit 442 into an entry of the central buffer 106 that is pointed to (at 406) by flit pointer X. Flit pointer X is stored in a location 420 of the central buffer pointer queue 220 pointed to by the pointer 223. The flit pointer X in the location 420 is then moved (at 408) from the central buffer pointer queue 220 to the output pointer queue 114. As the flit pointer is moved from the central buffer pointer queue 220 to the output pointer queue 114, the head pointer 222 is incremented by one to point to the location (420) of the central buffer pointer queue 220. The pointer 223 is incremented by one to point to the next location (422).

The next flit 444A is loaded (at 404) from the input FIFO storage 124 to an entry of the central buffer 106 that is pointed to by a flit pointer at location 422 in the central buffer pointer queue 220, which is now pointed to by the pointer 223. The flit pointer at location 422 is then removed from the central buffer pointer queue 220 and stored in the Next_Flit_Ptr field of the flit 442 in the central buffer pointer queue 220. The head pointer 222 and pointer 223 are then incremented again. The same is repeated for the other flits 444B and so forth in the packet 440, with the flit pointers associated with such other flits stored in the Next_Flit_Ptr field of the previous flit 444. Thus, as described above, the flit pointer (X) pointing to the first flit of the packet 440 is stored in the output pointer queue 114, while the flit pointers of the remaining flits are stored in the Next_Flit_Ptr field of the flits in the central buffer 106. Although shown as being grouped together in the central buffer 106, the flits of the packet 440 can actually be distributed in non-consecutive entries in the central buffer 106, depending on the available flit pointers in the central buffer pointer queue 220.

In the example of FIG. 7, it is assumed that another packet 450 is already in the central buffer 106. When the output engine 108 is ready to transmit the packet 450, the transmit engine 118 (FIG. 3) accesses the output pointer queue 114 to retrieve the first flit pointer of the first flit of the packet 450. When the flit is retrieved (at 410) from the central buffer 106, the first flit pointer is returned (at 412) to a location of the central buffer pointer queue 220 that is pointed to by the tail pointer 224. The tail pointer 224 is then incremented.

The transmit engine 118 then uses the Next_Flit_Ptr field contained in the first flit to access the next flit of the packet 450. When the next flit is retrieved, the flit pointer in the Next_Flit_Ptr field is returned by the output engine 108 to the central buffer pointer queue at the location pointed to by the tail pointer 224. The above is repeated until the last flit has been retrieved and loaded (at 410) into the output FIFO storage 110 or 112.

Figure 8:
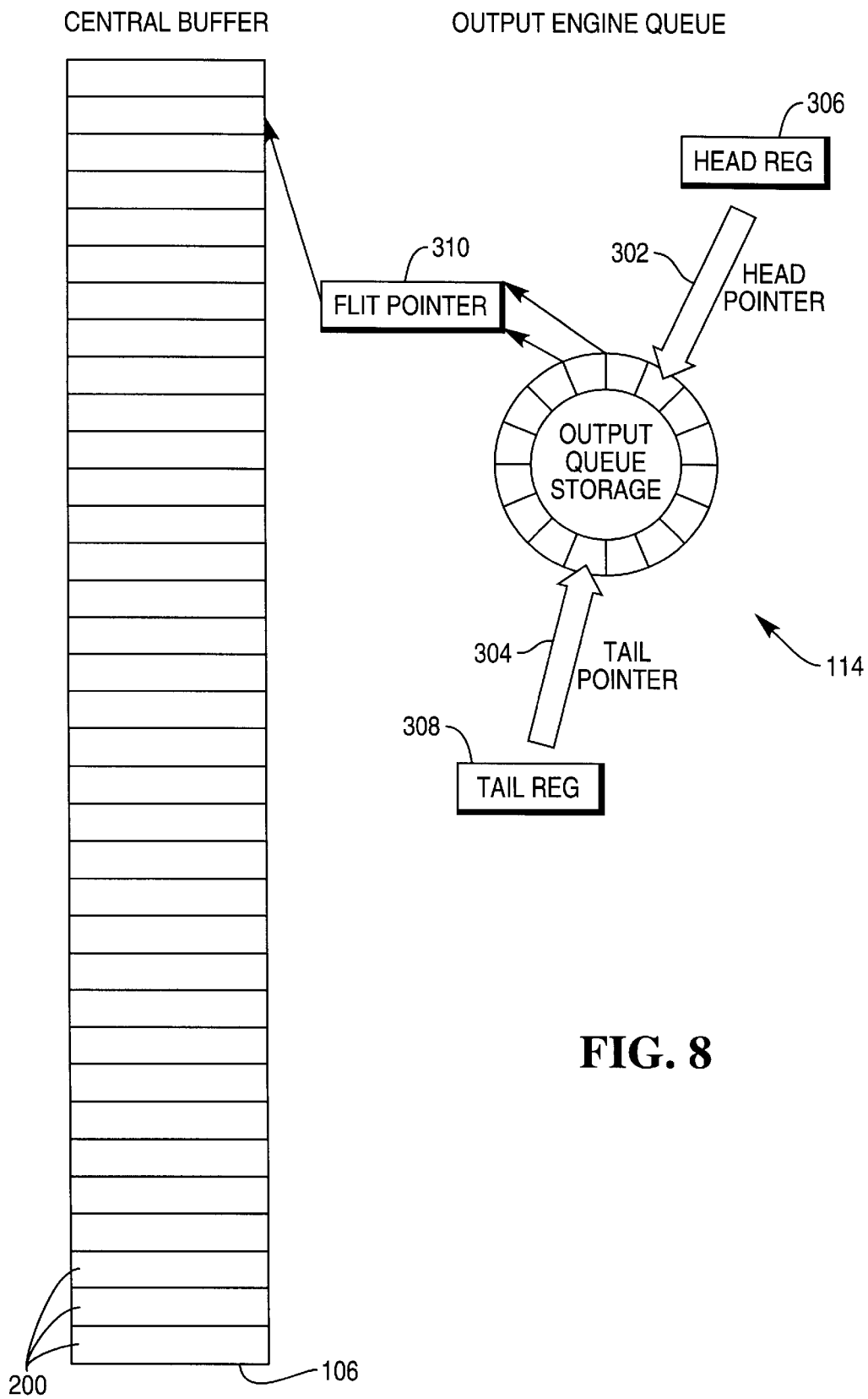
FIG. 8 illustrates an output engine queue that stores pointers to the central buffer.

The output pointer queue 114 is illustrated in FIG. 8. A head pointer 302 stored in a head pointer register 306 and a tail pointer 304 stored in a tail pointer register 308 points to two positions of the output pointer queue 114. Each entry of the output pointer queue 114 contains a flit pointer that points to a storage entry of the central buffer 106. The head and tail pointer registers 306 and 308 are initialized to an empty queue. The queue is empty when the head pointer 302 is one entry behind the tail pointer 304. The queue is full when the head pointer 302 and the tail pointer 304 are equal. At reset, the output pointer queue 114 is reset to empty. As flit pointers are moved from the central buffer pointer queue 220 to the output pointer queue 114, the tail pointer 304 is advanced. When flit pointers are returned to the central buffer pointer queue 220, the head pointer 302 is incremented.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A device comprising:
    a plurality of input ports;
    a plurality of output ports; and
    an interconnect switch between the input and output ports, the interconnect switch comprising:
        a main buffer,
        a main circular queue containing addresses pointing to storage entries in the main buffer, and
        a first element containing a first pointer to a location in the main circular queue, the location containing a first address indicating an available storage entry in the main buffer.

2. The device of claim 1, wherein each output port comprises an output queue, wherein the first pointer is incremented when the first address is moved from the main circular queue to one of the output queues.

3. The device of claim 2, wherein the interconnect switch further comprises a second element containing a second pointer to the main circular queue, the second pointer being incremented when a data unit is transmitted from one of the output ports.

4. The device of claim 3, wherein the first and second elements comprise first and second registers.

5. The device of claim 1, wherein the interconnect switch further comprises registers containing the first pointer and a second pointer, the first and second pointers being changed when data is provided from the input ports to the main buffer and as data is transmitted from the output ports.

6. The device of claim 1, wherein the interconnect switch further comprises output engines corresponding to the output ports, each output engine having an output queue containing pointers to entries in the main buffer having data to be transmitted from the corresponding output port.

7. The device of claim 6, wherein the output queue in each output engine comprises a circular queue.

8. The device of claim 6, wherein each output engine further comprises a first element storing a tail pointer to a first location in the output queue and a second element storing a head pointer to a second location in the output queue.

9. The device of claim 8, wherein each output engine is adapted to increment the tail pointer as addresses are moved from the main circular queue to the output engine queue and to increment the head pointer as addresses are returned from the output engine queue to the main circular queue.

10. The device of claim 6, wherein each output engine further comprises at least one FIFO storage to store data for transmission.

11. The device of claim 10, wherein each output engine comprises at least another FIFO storage.

12. The device of claim 11, wherein each output engine is adapted to alternately store data into the plural FIFO storages.

13. The device of claim 1, wherein each input engine comprises a FIFO storage to store incoming data.

14. The device of claim 13, wherein the incoming data comprises a packet.

15. The device of claim 14, wherein the input engine further comprises a module adapted to divide the packet into plural data units.

16. The device of claim 15, wherein the each entry of the central buffer queue is sized to receive one data unit.

17. A method of communicating between a set of input ports to a set of output ports, comprising:
    loading a data unit that contains portion of a data packet from an input port to an entry of a central buffer pointed to by an address in a location of a main queue, the main queue location being pointed to by a first pointer;
    incrementing the first pointer; and
    transferring the data unit, but not all data units that form the data packet, from the central buffer to an output port.

18. The method of claim 17, further comprising moving the address from the main queue to an output queue associated with the output port.

19. The method of claim 18, wherein incrementing the first pointer is performed in response to moving the address from the main queue to the output queue.

20. The method of claim 18, further comprising accessing the address in the output queue to retrieve the data unit from the central buffer for transfer to the output port.

21. The method of claim 20, further comprising:
    providing a second pointer to another location of the main queue; and
    incrementing the second pointer when the address is returned from the output queue to the main queue.

22. The method of claim 17, further comprising incrementing further the first pointer after additional data units are loaded into the central buffer.

23. The method of claim 22, wherein the main queue has a number of locations that is equal to a number of entries of the central buffer.

24. The method of claim 23, wherein incrementing the first pointer comprises starting at an initial value and wrapping to the initial value after the first pointer reaches a value that points to a last location of the main queue.

25. A system comprising:
    a plurality of first components;
    a plurality of second components; and an
    interconnect switch having input ports coupled to the first components and output ports coupled to the second components, the interconnect switch comprising:
        a main buffer,
        a main queue containing addresses pointing to storage entries in the main buffer, and
        a main queue controller adapted to generate a first pointer to point to an address in the main queue to indicate an available storage entry in the main buffer.

* * * * *